US008713417B2

(12) United States Patent
Jo

(10) Patent No.: US 8,713,417 B2
(45) Date of Patent: Apr. 29, 2014

(54) MULTI-CHANNEL MEMORY SYSTEM INCLUDING ERROR CORRECTION DECODER ARCHITECTURE WITH EFFICIENT AREA UTILIZATION

(75) Inventor: Namphil Jo, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1288 days.

(21) Appl. No.: 12/198,992

(22) Filed: Aug. 27, 2008

(65) Prior Publication Data

US 2009/0063934 A1 Mar. 5, 2009

(30) Foreign Application Priority Data

Aug. 28, 2007 (KR) .................. 10-2007-0086515

(51) Int. Cl.
*G06F 11/00* (2006.01)
(52) U.S. Cl.
USPC .......................................... 714/785
(58) Field of Classification Search
USPC ......................... 714/785, 764, 799
See application file for complete search history.

(56) References Cited

U.S. PATENT DOCUMENTS

| 4,246,473 | A  | * | 1/1981  | Maussion ............... 235/449 |
|-----------|----|---|---------|---------------------------------|
| 4,539,605 | A  | * | 9/1985  | Hoshino et al. ........... 360/32 |
| 4,689,792 | A  | * | 8/1987  | Traynor ................. 714/753 |
| 5,732,208 | A  |   | 3/1998  | Tamura et al.                   |
| 6,024,486 | A  | * | 2/2000  | Olarig et al. ............ 714/763 |
| 6,708,248 | B1 | * | 3/2004  | Garrett et al. ............ 711/104 |
| 6,735,725 | B1 | * | 5/2004  | Wu et al. ................. 714/704 |
| 7,584,308 | B2 | * | 9/2009  | Gower et al. ............. 710/35 |
| 7,865,809 | B1 | * | 1/2011  | Lee et al. ............... 714/782 |
| 8,327,244 | B1 | * | 12/2012 | Burd et al. .............. 714/786 |
| 2002/0066052 | A1 | * | 5/2002 | Olarig et al. ............. 714/42 |
| 2002/0073377 | A1 | * | 6/2002 | Patapoutian .............. 714/788 |
| 2002/0095598 | A1 | * | 7/2002 | Camble et al. ............ 713/200 |
| 2004/0117640 | A1 | * | 6/2004 | Chu et al. ................ 713/188 |
| 2004/0153823 | A1 | * | 8/2004 | Ansari .................... 714/38 |
| 2005/0172208 | A1 | * | 8/2005 | Yoon ..................... 714/784 |
| 2006/0039492 | A1 | * | 2/2006 | Azadet et al. ............. 375/262 |
| 2007/0079065 | A1 | * | 4/2007 | Bonella et al. ............ 711/113 |

(Continued)

FOREIGN PATENT DOCUMENTS

| JP | 10154940    | 6/1998 |
| JP | 2006224259  | 9/2006 |
| KR | 19970050872 | 7/1997 |

OTHER PUBLICATIONS

Wikipedia online dictionary, Computer definition, retrieved from http://en.wikipedia.org/wiki/Computer on Mar. 2, 2013.*

(Continued)

*Primary Examiner* — Yair Leibovich
(74) *Attorney, Agent, or Firm* — Volentine & Whitt, PLLC

(57) ABSTRACT

A memory system includes: a memory controller including an error correction decoder. The error correction decoder includes: a demultiplexer adapted to receive data and demultiplex the data into a first set of data and a second set of data; first and second buffer memories for storing the first and second sets of data, respectively; an error detector; an error corrector; and a multiplexer adapted to multiplex the first set of data and the second set of data and to provide the multiplexed data to the error corrector. While the error corrector corrects errors in the first set of data, the error detector detects errors in the second set of data stored in the second buffer memory.

25 Claims, 7 Drawing Sheets

(56) References Cited

U.S. PATENT DOCUMENTS

| | | | | |
|---|---|---|---|---|
| 2007/0277060 A1* | 11/2007 | Cornwell et al. | ............... | 714/54 |
| 2008/0256415 A1* | 10/2008 | Ostertun et al. | .............. | 714/758 |
| 2009/0024902 A1* | 1/2009 | Jo et al. | ......................... | 714/763 |
| 2009/0063923 A1* | 3/2009 | Gower et al. | .................. | 714/746 |
| 2009/0150751 A1* | 6/2009 | Jo et al. | ......................... | 714/763 |

OTHER PUBLICATIONS

Wikipedia online dictionary, Communication channel definition, retrieved from http://en.wikipedia.org/wiki/Communication_channel on Mar. 2, 2013.*

Wikipedia online dictionary, Antivirus software definition, retrieved from http://en.wikipedia.org/wiki/Antivirus_software on Mar. 2, 2013.*

Wikipedia online dictionary, Multiplexing definition, retrieved from http://en.wikipedia.org/wiki/Multiplexing on Mar. 2, 2013.*

Japanese Office Action Dated Feb. 12, 2013 in Related Japanese Patent Application No. 2008-219946.

Korean Office Action in Korean Patent Application No. 10-2007-0086515 Issued Oct. 31, 2013.

* cited by examiner

MULTI-CHANNEL MEMORY SYSTEM INCLUDING ERROR CORRECTION DECODER ARCHITECTURE WITH EFFICIENT AREA UTILIZATION

CROSS-REFERENCES TO RELATED APPLICATIONS

This claims priority under 35 U.S.C. §119 from Korean Patent Application 10-2007-0086515, filed on 28 Aug. 2007 in the name of Namphil Jo, the entirety of which is hereby incorporated by reference for all purposes as if fully set forth herein.

BACKGROUND AND SUMMARY

1. Field

This invention pertains to the field of memory systems, and more particularly, to the field of memory systems employing error correction decoding.

2. Description

In some flash memory systems, a multi-channel error correction coder (ECC) architecture is employed with buffer memories for encoding/decoding the data from the host system to and from the flash memory.

FIG. 1 shows a block diagram of such a flash memory system 10. Flash memory system 10 includes a flash memory controller 100 and a memory block 200. Memory controller 100 includes a host interface 190, a user data buffer 120, a system data buffer 130, a NAND interface 140, and a central processing unit 150, all connected together by a system bus 160. NAND interface 140 includes a direct memory access (DMA) controller 144 and an error correction coder (ECC) block 145. ECC block 145 includes a plurality (N) of ECC modules, including ECC modules 141, 142 and 143. Memory block 200 includes a plurality (N) of NAND memory devices, including memory devices 211, 212 and 213. Connected between each of the ECC modules 141, 142 and 143 and a corresponding one of the memory devices 211, 212 and 213 is a channel 0, 1, N, etc. Another embodiment of NAND interface 140 may include a plurality (M) of direct memory access (DMA) controller 144. Here, M is integer greater than 1. M may be same as N or not.

FIG. 2 illustrates in greater detail interconnections between ECC block 145 and memory devices 211, 212 and 213 in flash memory system 10. As seen in FIG. 2, ECC module 141 includes encoder 161, and decoder block 165, which further comprises detector 162 and corrector 163. Likewise, ECC module 142 includes encoder 171, and decoder block 175, which further comprises detector 172 and corrector 173; and ECC module 143 includes encoder 181, and decoder block 185, which further comprises detector 182 and corrector 183.

In operation, data from a host device (e.g., a processor) destined to be stored in a memory device 211, for example, is sent by DMA controller 144 to ECC module 141. In ECC module 141, the data is first encoded by the encoder 161 and then transmitted to memory device 211 via channel 0. When data is to be read from memory device 211 and provided to a host device, it is first decoded by decoder 165 and then the decoded data is supplied to DMA controller 144. In decoder 165, detector 162 detects whether any errors are present in the data received from memory device 211, and if there are any errors, then corrector 163 corrects the errors.

There is a trend for flash memory systems to have more and more memory devices. There is also a trend for flash memory systems to employ multi-level cell (MLC) NAND memory devices for increased storage capacity. As a result, flash memory systems also require more and more ECC modules. However, adding more ECC modules enlarges the size of the integrated circuit, and increases the number of ECC IP core gates, for the flash memory controller. This increases the complexity and cost of the flash memory system.

Accordingly, it would be desirable to provide a memory system that can provide robust error detection and correction with a more efficient utilization of area and circuitry in a memory controller. It would also be desirable to provide a method of processing data in a memory system that supports a more efficient utilization of area and circuitry in a memory controller.

The present invention is directed to a memory system, and a method of processing data in a memory system.

In one aspect of the inventive concept, a memory system comprises: at least two memory devices; and a memory controller having at least first and second communication channels each for communicating data with at least one of the memory devices. The memory controller comprises: at least first and second error detectors corresponding to the first and second communication channels and each adapted to detect errors in data sets received via the corresponding communication channel from at least one of the memory devices; and an error corrector adapted to correct errors detected by each of the at least first and second error detectors.

In another aspect of the inventive concept, a memory system comprises: a memory controller having a first input port for communication with a first memory device via a first communication channel, a second input port for communication with a second memory device via a second communication channel, and an error decoder that is multiplexed for decoding data received from both the first and the second communication channels.

In yet another aspect of the inventive concept, a method of processing data received from at least two memory devices via at least two corresponding communication channels, comprises: detecting errors in a first data set received via a first communication channel while detecting errors in a second data set received via a second communication channel; and correcting the detected errors in the first data set and then subsequently correcting errors in the second data set.

In still another aspect of the inventive concept, an error decoder comprises: at least first and second error detectors corresponding to first and second communication channels and each adapted to detect errors in data sets received via the corresponding communication channel from at least one of memory devices; and an error corrector adapted to correct errors detected by each of the at least first and second error detectors

DETAILED DESCRIPTION

Figure 1:
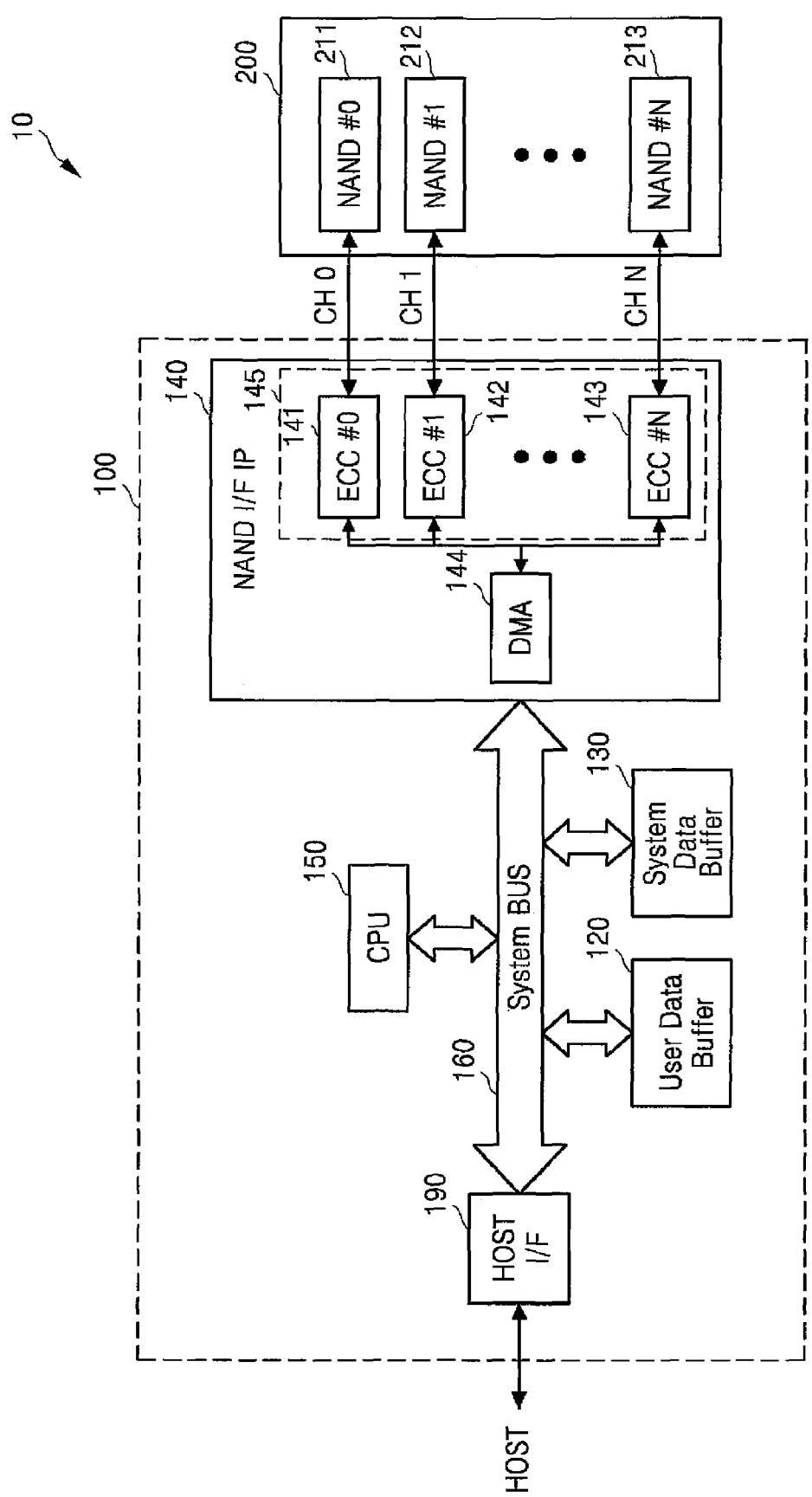
FIG. 1 shows a block diagram of a flash memory system.
Figure 2:
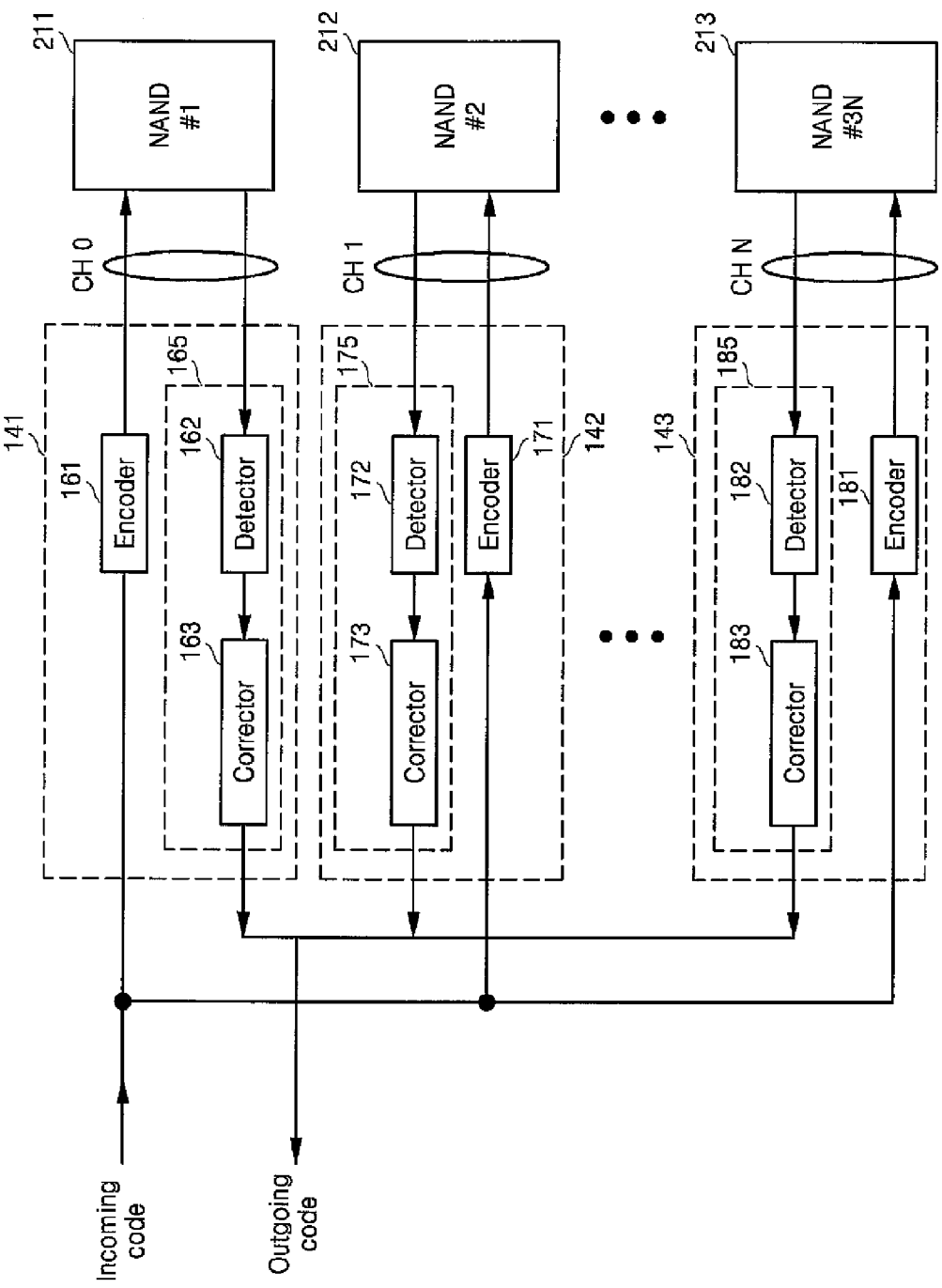
FIG. 2 illustrates connections between an error correction coder (ECC) block and memory devices.
Figure 3:
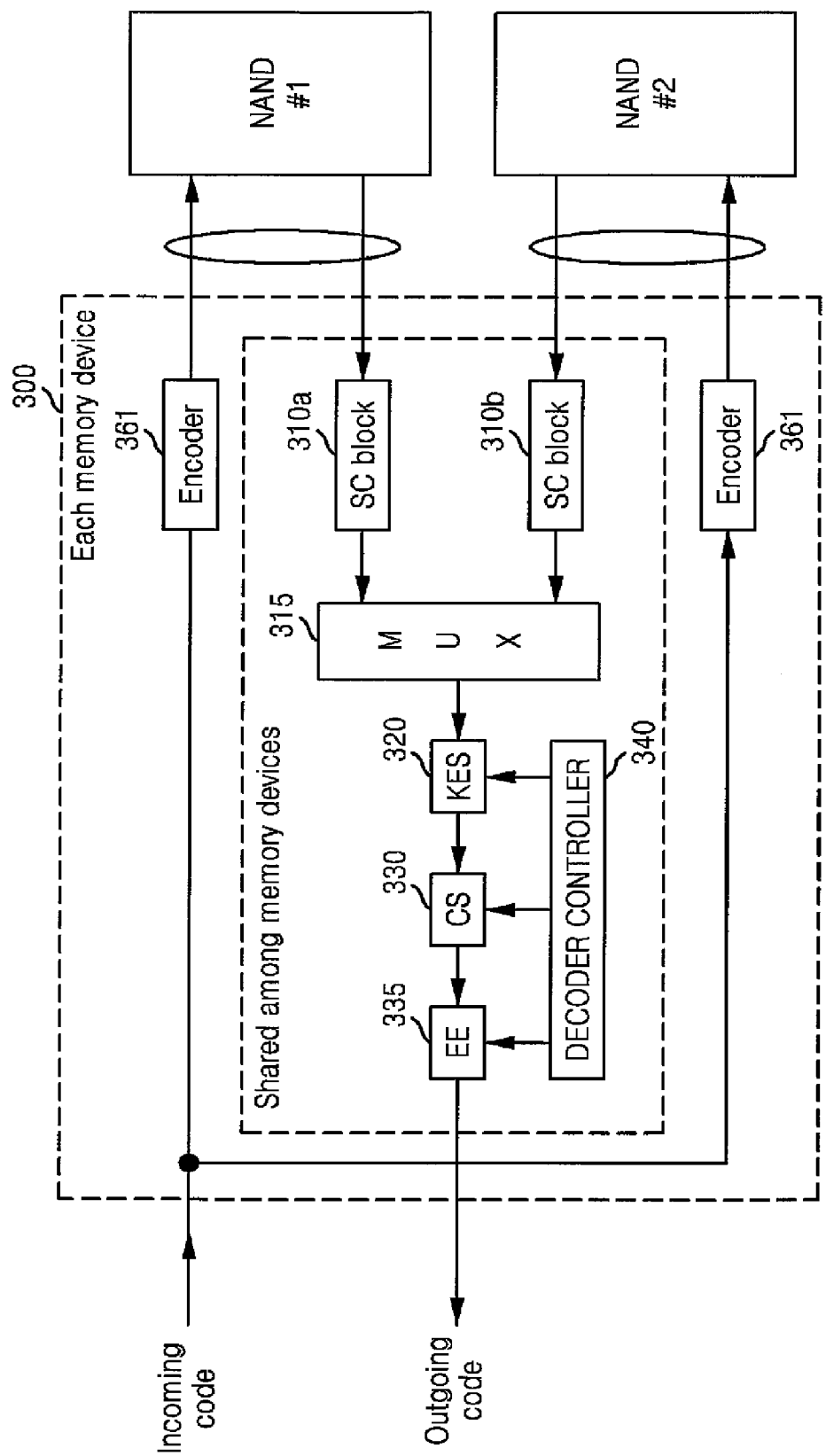
FIG. 3 illustrates a block diagram of one embodiment of a flash memory error correction coder (ECC) block that can operate in a two channel memory system.

FIG. 3 illustrates a block diagram of one embodiment of a flash memory error correction coder (ECC) block 300 that can operate in a two channel memory system. ECC block 300 is a Bose-Chaudhuri-Hocquenghem (BCH) error correction coder.

ECC block 300 includes two data encoders 361, one each for the first and second communication channels. ECC block 300 also includes two syndrome computation blocks 310a and 310b, again one for each of the first and second communication channels. ECC block 300 further includes a multiplexer (or data switch) 315, a key equation solver (KES) block 320, Chien search and error evaluator blocks 330 and 335, and a decoder controller 340.

In operation, ECC block 300 communicates data with memory devices (e.g., flash memory devices) over two communication channels operating at the same time as each other in parallel. When data from a host device (e.g., a processor) is to be written to the memory devices via the two communication channels, the data is first encoded (e.g. with a BCH code) by a corresponding encoder 361 for each communication channel. Then, the encoded data is transmitted in parallel across the two communication channels to the memory devices.

When the encoded data is to be read from the memory devices via the two communication channels, it is decoded before being sent to a host device (e.g., a processor). Accordingly, syndrome computation block 310a computes the syndrome of a first set of data (e.g., data from an Nth sector of memory) received via the first communication channel at the same time that syndrome computation block 310b computes the syndrome of a second set of data (e.g., data from an Mth sector of memory) via the second communication channel.

If the syndrome values for a set of data are zero, then this indicates that the data set does not include errors. Otherwise, then the data set includes one or more errors and therefore, the errors should be located and corrected. That is, the syndrome computation blocks 310a and 310b detect whether or not a data set includes errors.

Beneficially, ECC block 300 includes multiplexer 315 so that the two communication channels can share one key equation solver (KES) block 320, and one Chien search and error evaluator (blocks 330 and 335), under control of controller 340. That is, multiplexer 315 multiplexes between the first and second communication channels for locating errors that occur in data sets received from the memory devices via the communication channels. Once the errors are identified in a data set, then the errors are corrected in a further error correction block not shown in FIG. 3 (e.g., an exclusive-or (XOR) circuit) and the decoded data set may then be sent to a host device (e.g., a processor).

Figure 4:
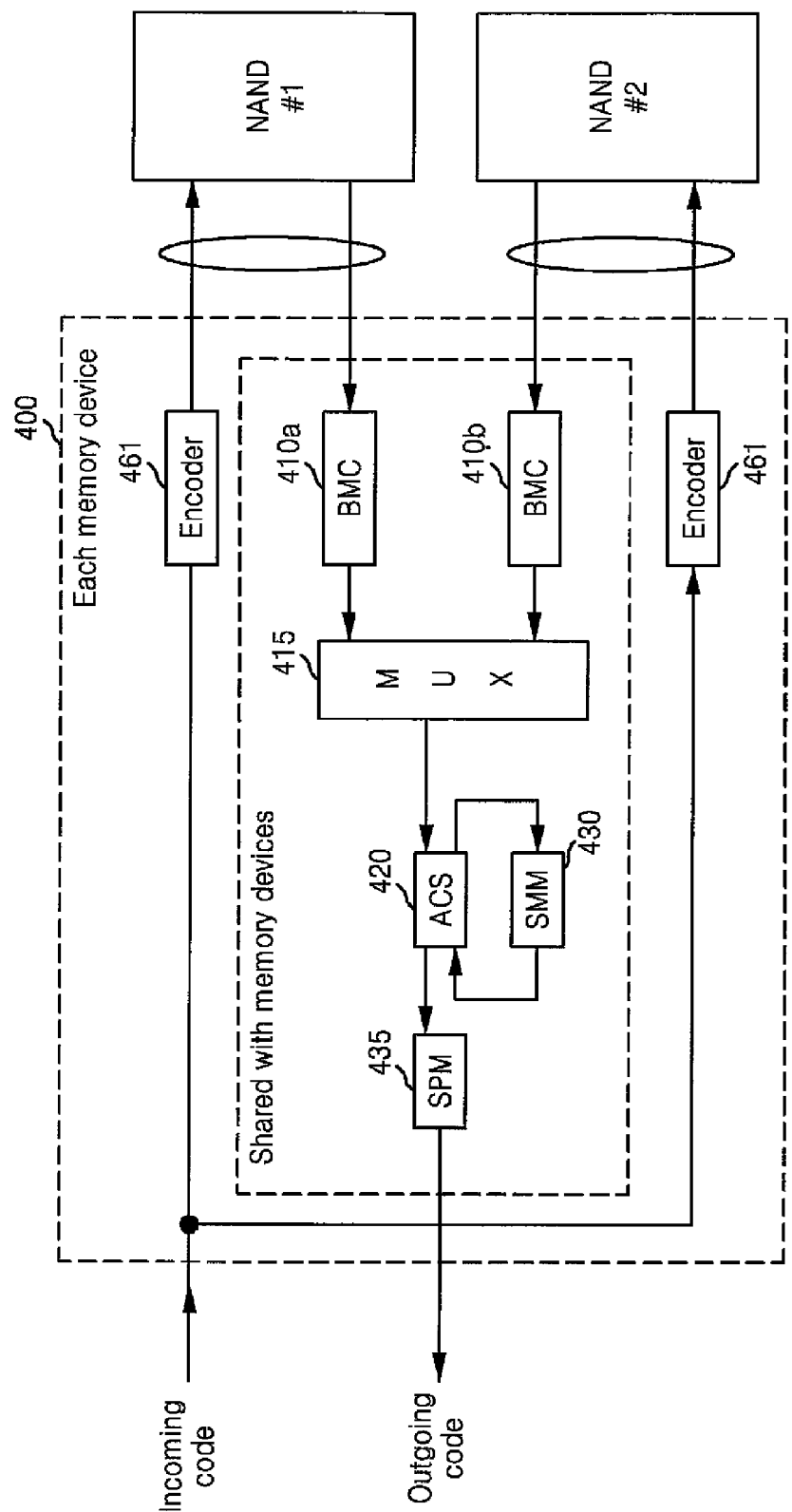
FIG. 4 illustrates a block diagram of another embodiment of a flash memory error correction coder (ECC) block that can operate in a two channel memory system.

FIG. 4 illustrates a block diagram of another embodiment of a flash memory error correction coder (ECC) block 400 that can operate in a two-channel memory system. ECC block 400 is a convolutional error correction coder. In particular, ECC block 400 includes a Viterbi decoder.

ECC block 400 includes two data encoders 461, one each for the first and second communication channels. ECC block 400 also includes two branch matrix calculators 410a and 410b, again one for each of the first and second communication channels. ECC block 400 further includes a multiplexer (or data switch) 415, add-compare-select (ACS) block 420, state metrics memory (SMM) 430, and survivor path memory (SPM) 435.

In operation, ECC block 400 communicates data with memory devices (e.g., flash memory devices) over two communication channels operating at the same time as each other in parallel. When data from a host device (e.g., a processor) is to be written to the memory devices via the two communication channels, the data is first encoded (e.g., convolutionally encoded) by a corresponding encoder 461 for each communication channel. Then, the encoded data is transmitted in parallel across the two communication channels to the memory devices.

When the encoded data is to be read from the memory devices via the two communication channels, it is decoded before being sent to a host device (e.g., a processor). Accordingly, branch matrix calculator 410a calculates the branch metrics of each trellis branch for a first set of data (e.g., data from an Nth sector of memory) received via the first communication channel at the same time that branch matrix calculator 410b calculates the branch metrics of each trellis branch for a second set of data (e.g., data from an Mth sector of memory) via the second communication channel.

Beneficially, ECC block 400 includes multiplexer 415 so that the two communication channels can share one add-compare-select (ACS) block 420, one state metrics memory (SMM) 430, and one survivor path memory (SPM) 435. That is, multiplexer 415 multiplexes between the first and second communication channels for correcting errors that occur in data sets received from the memory devices via the communication channels.

Figure 5:
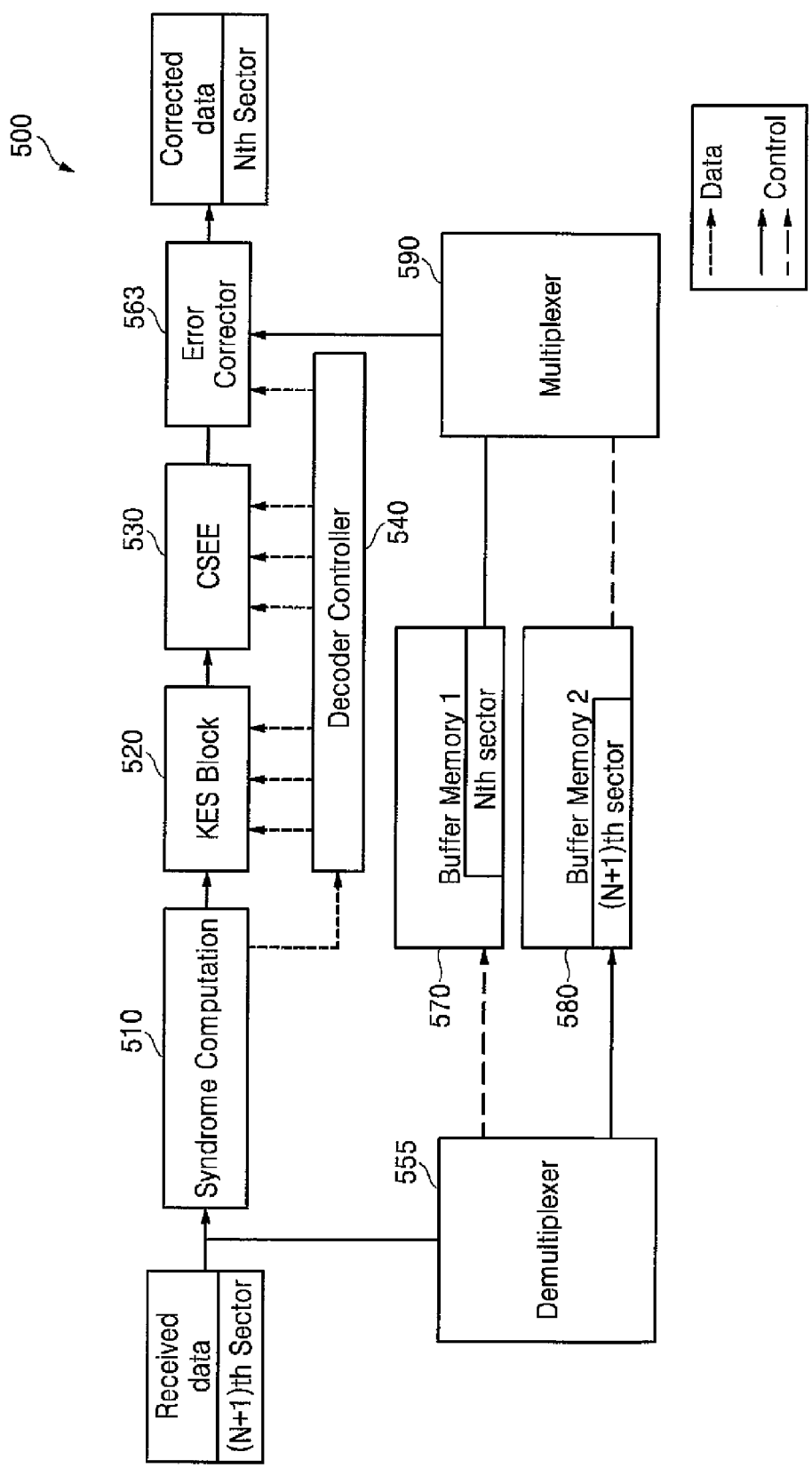
FIG. 5 illustrates a block diagram of one embodiment of a flash memory error correction decoder that can operate in a pipelined mode.

FIG. 5 illustrates a block diagram of one embodiment of a BCH flash memory error correction decoder 500 that can operate in a pipelined mode. Decoder 500 includes a syndrome computation block 510, a key equation solver (KES) block 520, a Chien search and error evaluator (CSEE) block 530, a decoder controller 540, a demultiplexer (or data switch) 555, an error corrector 563, a first buffer memory 570, a second buffer memory 580, and a multiplexer (or data switch) 590.

In operation, a first set of data (e.g., data from Nth sector) is received via demultiplexer 555 into first buffer memory 570 and syndrome computation block 510 computes a syndrome of a first set of data. If the syndrome indicates that errors have occurred in the first data set, decoder controller 540 controls KES block 520 and Chien search and error evaluator block 530 to locate the errors in the first set of data while attempting to minimize latency delays to error corrector 563. Multiplexer 590 sends the first set of data from first memory buffer 570 to error corrector 563 for error correction. In parallel with these operations for the first set of data, a second set of data (e.g., data from an (N+1)th sector) is received via demultiplexer 550 into second buffer memory 580 and syndrome computation block 510 computes a syndrome of the second set of data. After the first set of data is output from decoder 500, then the decoder controller 540 controls (KES) block 520 and Chien search and error evaluator block 530 to locate the errors in the second set of data, wherein multiplexer 590 sends the second set of data from second memory buffer 580 to error corrector 563 for error correction. During this time period, a third set of data may be received via demultiplexer 550 into first buffer memory 570 and syndrome computation block 510 computes a syndrome of a third set of data. The process continues in like manner for all subsequent sets of data (e.g., sectors from a memory device).

Figure 6:
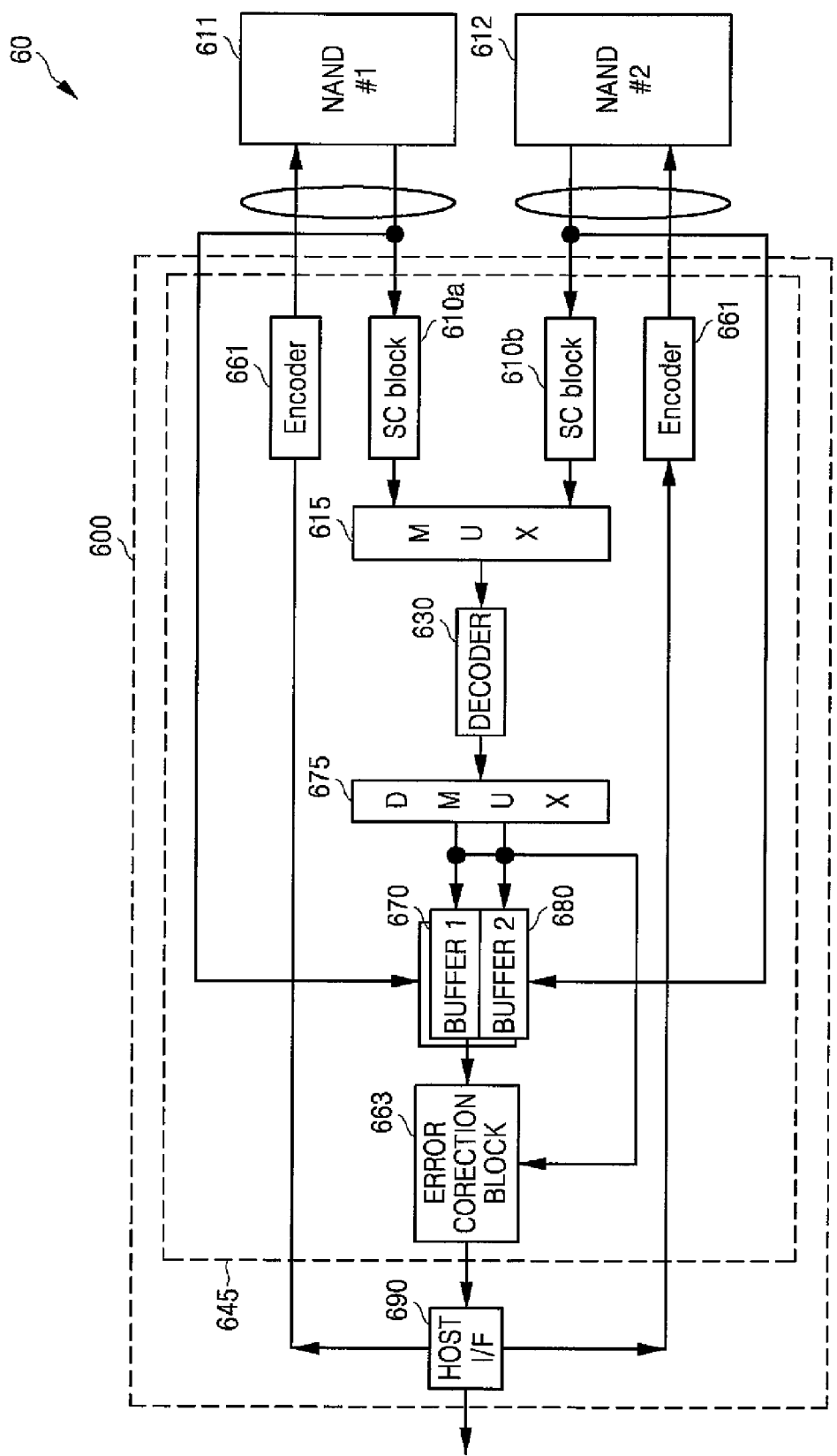
FIG. 6 illustrates a two channel flash memory system that can operate in a pipelined mode with a buffer memory structure.

FIG. 6 illustrates a two channel flash memory system 60 that can operate in a pipelined mode with a buffer memory structure. Flash memory system 60 includes a flash memory controller 600 and NAND memory devices 611 and 612. Flash memory controller 600 communicates data with memory devices 611 and 612 over two communication channels operating at the same time as each other in parallel.

Flash memory controller 600 includes ECC block 645 and host interface 690. ECC block 645 includes two data encoders 661, one each for the first and second communication channels. ECC block 645 also includes two syndrome computation blocks 610a and 610b, again one for each of the first and second communication channels. ECC block 645 further includes a multiplexer (or data switch) 615, a decoder block 630, a demultiplexer 675, first and second memory buffers 670 and 680, third and fourth memory buffers (not labeled), and an error correction block 663.

In operation, ECC block 645 communicates data with memory devices 611 and 612 over two communication channels operating at the same time as each other in parallel. When data from a host device (e.g., a processor) is to be written to the memory devices via the two communication channels, the data is first encoded (e.g. with a BCH code) by a corresponding encoder 661 for each communication channel. Then, the encoded data is transmitted in parallel across the two communication channels to memory devices 611 and 612.

When the encoded data is to be read from memory devices 611 and 612 via the two communication channels, it is decoded before being sent to a host device (e.g., a processor). Accordingly, syndrome computation block 610a computes the syndrome of a first set of data (e.g., data from an Nth sector of memory) received via the first communication channel at the same time that syndrome computation block 610b computes the syndrome of a second set of data (e.g., data from an Mth sector of memory) via the second communication channel.

If the syndrome values for a set of data are zero, then this indicates that the data set does not include errors. Otherwise, then the data set includes one or more errors and therefore, the errors should be located and corrected. That is, the syndrome computation blocks 610a and 610b detect whether or not a data set includes errors.

Beneficially, ECC block 645 includes multiplexer 615 so that the two communication channels can share one key equation solver (error decoder block 630. That is, multiplexer 615 multiplexes between the first and second communication channels for locating errors that occur in data sets received from the memory devices via the communication channels. Once the errors are identified in a data set, then the errors are corrected in error correction block 663 (e.g., an exclusive-or (XOR) circuit) and the decoded data set may then be sent to a host device (e.g., a processor).

In more detail, ECC block 645 operates in a pipeline mode as follows. When data sets are read into memory controller 600 from the two memory chips 611 and 612, errors in the data sets received from the two communication channels are detected at the same time. At this time, the data sets are stored in buffer memories 670 and 680, waiting for correction and transmission to the host.

Decoder block 630 calculates the error locations for a first data set read data from memory device 611, and then the first set of data stored in buffer memory 670 is corrected and transmitted to the host. While the first data set stored in buffer memory 670 is being transmitted to the host, decoder block 630 calculates error locations for a second data set read data from memory device 612, and then the second set of data stored in buffer memory 680 is corrected and transmitted to the host after the data in the buffer memory 670 has finished.

While the second set of data in the buffer memory 680 is being corrected and the first set of data in buffer memory 670 is being transmitted to the host, a new (third) data set from memory device 611 is stored in the third memory buffer and a new (fourth) data set from memory device 612 is stored in the fourth memory buffer, and the process is repeated.

This process can be further explained by reference to FIG. 7, which illustrates a timing chart 700 of pipelined decoding operations for a BCH flash memory error correction decoder.

Figure 7:
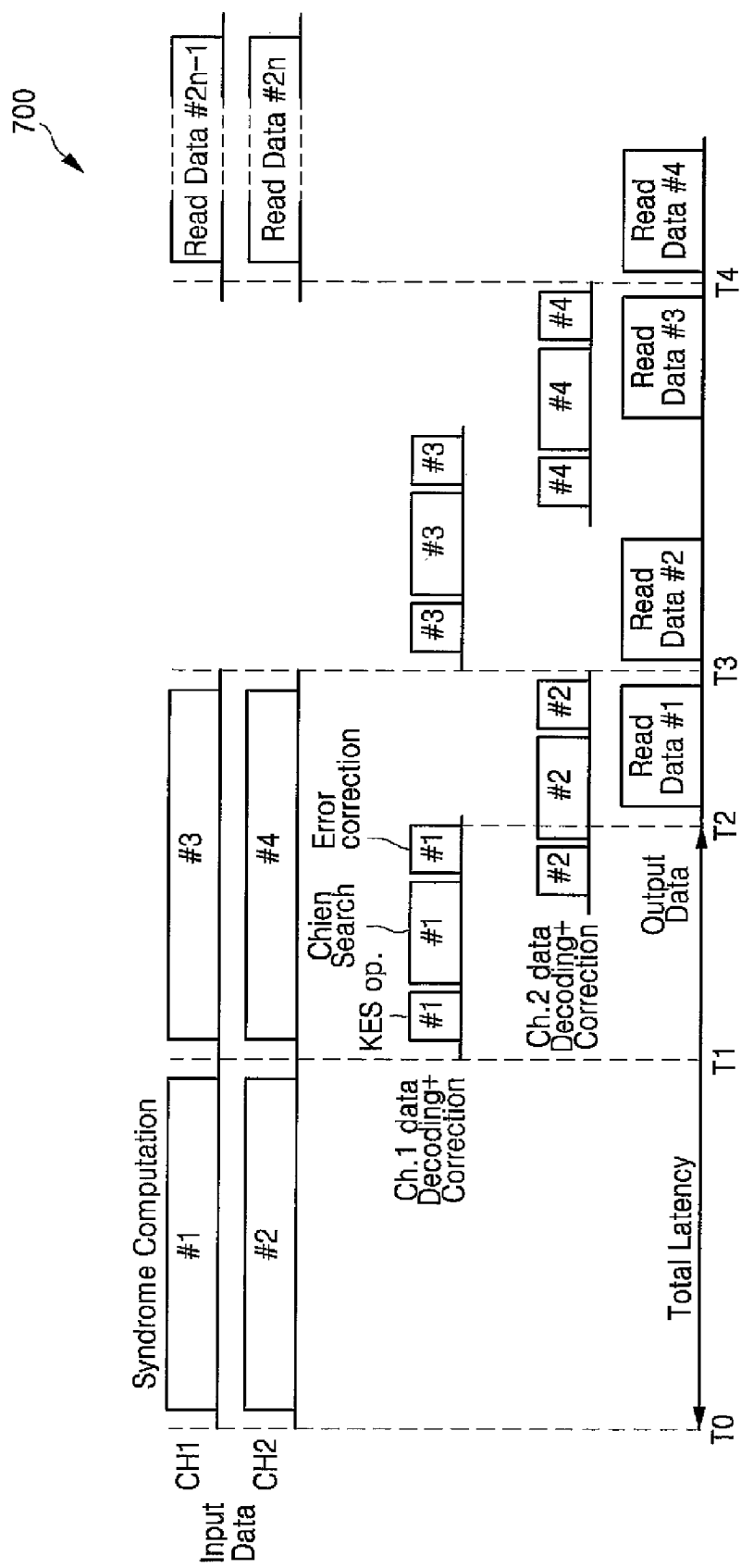
FIG. 7 illustrates a timing chart of pipelined decoding operations of a Bose-Chaudhuri-Hocquenghem (BCH) flash memory error correction decoder.

In the example illustrated in FIG. 7, a syndrome computation block is connected to each channel and reads data from first and second buffer memories, and when an error occurs in two channels at the same time, then correction steps are undertaken. The ECC is operated in a pipeline mode, using a syndrome value of a data set received from memory via the first communication channel and calculating error locations in the data set and then continuously calculating error locations in the a data set received from memory via the second communication channel.

By employing a buffer memory for reading data to calculate syndrome values, a buffer memory for storing the data while calculating error locations and pattern, and a buffer memory for transmitting the corrected data to the host, an area-efficient, low-latency, high throughput ECC IP and memory system can be provided. In the example illustrated in FIG. 7, a forward Chien search is employed, and search/correction and data transmission are simultaneously enabled, so error correction can be operated on the local bus of the memory controller between the buffer memory and the host interface. In an arrangement where a backward Chien search is employed, search/correction is finished before data transmission is enabled, so data correction may be operated in the buffer memory.

The top two lines of the timing chart 700 represent the timing of receiving data sets from first and second communication channels, respectively, and computing the syndromes of the data sets. As illustrated, in a first time period T0-T1, a first codeword is received via the first communication channel and stored in the first buffer memory, while a second codeword is received via the second communication channel and stored in the second buffer memory. Then, in a time period T1-T3, a third codeword is received via the first communication channel and stored in the third buffer memory, while a fourth codeword is received via the second communication channel and stored in the fourth buffer memory.

The third and fourth lines from the top of the timing chart 700 represent the timing of solving the key equations and performing the Chien search and error evaluation processes on the data sets received from first and second communication channels, respectively. Error decoding and correction are operated in a pipeline mode using a single error correction and buffer memories. So errors in the first data set can be location can be located and corrected while syndrome values are being calculated for the third and fourth data sets in parallel. In FIG. 7, errors in the first set of data received via the first communication channel also can be corrected while error locations are identified for the second set of data received via the second communication channel.

The bottom line in FIG. 7 shows the timing of data being output by the error correction coder (ECC) block. At time T2, after the errors in the first set of data have been corrected, then the first set of data is begun to be read out of the ECC block. The first set of data is read out of the ECC block by time T3. Subsequently, in the time period from T3-T4 the second and third sets of data are read out of the ECC block, while new data sets are read into the ECC block and the syndrome values of these new data sets are calculated. This process repeats as new data sets are read into the ECC block.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A memory system, comprising:
   first and second memory devices; and
   a memory controller configured during a read operation to read encoded data stored in both of the first and second memory devices via respective first and second communication channels, wherein the first communication channel communicates a first data set of the encoded data from the first memory device to the memory controller in parallel with the second communication channel communicating a second data set of the encoded data from the second memory device to the memory controller, the memory controller comprising:
      a first error detector dedicated to the first communication channel and configured to generate first values indicating first errors in the first data set, and a second error detector dedicated to the second communication channel and configured to generate second values indicating second errors in the second data set in parallel with the generation of the first values;
      a multiplexer that selects between the first and second values to generate multiplexed error detection information; and
      an error corrector configured to correct the first and second errors in the first and second data sets in response to the multiplexed error detection information.

2. The memory system of claim 1, wherein the memory controller further comprises:
   a first buffer that stores the first data set received from the first communication channel; and
   a second buffer that stores the second data set received from the second communication channel,
   wherein the error corrector comprises an error location identifier that determines respective error locations for the first and second errors in the first and second data sets using the multiplexed error detection information.

3. The memory system of claim 2, wherein the error location identifier simultaneously determines the respective error locations for the first and second errors in the first and second data sets.

4. The memory system of claim 2, wherein the memory controller further comprises:
   a third buffer that stores a third data set received from the first communication channel subsequent to the first data set; and
   a fourth buffer that stores a fourth data set received from the second communication channel subsequent to the second data set,
   wherein the first error detector generates third values indicating third errors in the third data set and the second error detector generates fourth values indicating fourth errors in the fourth data set in parallel with the generation of the third values,
   the multiplexer is further configured to multiplex the third and fourth values to generate the multiplexed error detection information,
   the error corrector is further configured to correct the third and fourth errors in the third and fourth data sets in response to the multiplexed error detection information, and
   the error location identifier determines the respective error locations for the first and second errors in the first and second data sets while the first and second error detectors respectively generate the third and fourth values.

5. The memory system of claim 4, wherein the memory controller further comprises:
   a demultiplexer that demultiplexes multiplexed error location identification information provided by the error location identifier.

6. The memory system of claim 1, wherein the error corrector comprises:
   an error location identifier that determines respective error locations for the first and second errors in the first and second data sets using the multiplexed error detection information and comprises:
   a key equation solver;
   a Chien-search algorithm block; and
   an error evaluator.

7. The memory system of claim 6, wherein the memory controller further comprises:
   a first buffer that stores the first data set received from the first communication channel;
   a second buffer that stores the second data set received from the second communication channel;
   a third buffer that stores a third data set of the encoded data received from the first communication channel subsequent to the first data set;
   a fourth buffer that stores a fourth data set of the encoded data received from the second communication channel subsequent to the second data set,
   the first error detector generates third values indicating third errors in the third data set, and the second error detector generates fourth values indicating fourth errors in the fourth data set in parallel with the generation of the third values,
   the multiplexer is further configured to multiplex the third and fourth values to generate the multiplexed error detection information, and
   the error corrector determines the second errors in the second data set while a corrected first data set is being transmitted to a host device, and while the third data set is being stored in the third buffer, and the fourth data set is being stored in the fourth buffer.

8. The memory system of claim 1, wherein the first error detector calculates first branch metrics of a first data set, and the second error detector calculates second branch metrics of a second data set.

9. The memory system of claim 8, wherein the memory controller further comprises a multiplexer that multiplexes the first and second branch metrics to provide multiplexed first and second branch metrics to the error corrector.

10. The memory system of claim 8, wherein the error corrector comprises:
    an add-compare-select block;
    a state metrics memory; and
    a survivor path memory.

11. A memory system, comprising:
    a memory controller having a first input port for communication with a first memory device via a first communication channel, a second input port for communication with a second memory device via a second communication channel, and an error decoder that is receives multiplexed decoding data collectively received from the first and the second communication channels, wherein the error decoder is a convolutional decoder and comprises:
- a first branch metrics calculator that calculate first branch metrics for a first data set data received via the first communication channel;
- a second branch metrics calculator that calculate second branch metrics for a second data set received via the second communication channel;
- an error corrector that corrects first and second errors respectively in the first and second data sets; and
- a multiplexer having first and second inputs respectively connected to outputs of the first and second branch metrics calculators, and having an output connected to an input of the error corrector, wherein the error decoder comprises first and second error detectors respectively dedicated to the first and second communication channels, the first error detector detecting the first errors while the second error detector detects the second errors.

12. A method of processing data received in a memory controller from first and second memory devices, the method comprising:
- receiving in the memory controller a first data set from the first memory device via a dedicated first communication channel, a second data set from the second memory device via a dedicated second communication channel in parallel with receiving the first data set, a third data set from the first memory device via the first communication channel subsequent to the first data set, and a fourth data set from the second memory device via the second communication channel subsequent to the second data set and in parallel with receiving the third data set;
- detecting first errors in the first data set using a first error detector dedicated to the first communication channel and generating corresponding first values, while at the same time detecting second errors in the second data set using a second error detector dedicated to the second communication channel and generating corresponding second values;
- selecting between the first and second values respectively provided to a multiplexer by the first and second detectors;
- correcting the first errors in the first data set in an error corrector using the first values passed by the multiplexer, and then subsequently correcting the second errors in the second data set in the error corrector using the second values passed by the multiplexer; and
- detecting third errors in the third data set while detecting fourth errors in the fourth data set, while also correcting the first errors in the first data set.

13. The method of claim 12, further comprising identifying locations for the first errors in the first data set prior to correcting the first errors, and identifying locations for the second errors in the second data set prior to correcting the second errors.

14. The method of claim 12, wherein correcting the first errors in the first data set comprises:
- solving a key equation for the first data set;
- executing a Chien-search algorithm for the first data set; and
- evaluating errors in the first data set.

15. The method of claim 12, wherein detecting the respective first and second errors in the first and second data sets comprises calculating respective first and second branch metrics for the first and second data sets.

16. An error decoder used in a memory controller to correct errors in encoded data read from first and second memory devices during a read operation, the error decoder comprising:
- a first error detector that receives a first data set of the encoded data from the first memory device via a dedicated first communication channel;
- a second error detector that receives a second data set of the encoded data from the second memory device via a dedicated second communication channel in parallel with the first error detector receiving the first data set, wherein the first error detector generates first values indicating first errors in the first data set in parallel with the second error detector generating second values indicating second errors in the second data set;
- a multiplexer that selects between the first and second values to generate multiplexed error detection information; and
- an error corrector configured to sequentially correct the first errors in the first data set using the multiplexed error detection information, and then the second errors in the second data set using the multiplexed error detection information.

17. The error decoder of claim 16, further comprising:
- a first buffer that stores the first data set received from the first communication channel; and
- a second buffer that stores the second data set received from the second communication channel,
- wherein the error corrector comprises an error location identifier that determines respective error locations for the first and second errors in the first and second data sets using the multiplexed error detection information.

18. The error decoder of claim 17, wherein the error location identifier simultaneously determines first and second error locations respectively located within the first and second data sets.

19. The error decoder of claim 17, further comprising:
- a third buffer that stores a third data set received from the first communication channel subsequent to the first data set; and
- a fourth buffer that stores a fourth data set received from the second communication channel subsequent to the second data set,
- wherein the first error detector generates third values indicating third errors in the third data set and the second error detector generates fourth values indicating fourth errors in the fourth data set in parallel with the generation of the third values,
- the multiplexer further selects between the third and fourth values to generate the multiplexed error detection information,
- the error corrector is further configured to correct the third and fourth errors in the third and fourth data sets in response to the multiplexed error detection information, and
- the error location identifier determines the respective error locations for the first and second errors in the first and second data sets while the first and second error detectors respectively generate the third and fourth values.

20. The error decoder of claim 19, further comprising a demultiplexer that demultiplexes error location identification information provided by the error location identifier.

21. The error decoder of claim 17, wherein the error location identifier comprises:

a key equation solver;
a Chien-search algorithm block; and
an error evaluator.

22. The error decoder of claim 21, further comprising
a third buffer that stores a third data set of the encoded data received from the first communication channel subsequent to the first data set;
a fourth buffer that stores a fourth data set of the encoded data received from the second communication channel subsequent to the second data set,
the first error detector generates third values indicating third errors in the third data set, and the second error detector generates fourth values indicating fourth errors in the fourth data set in parallel with the generation of the third values,
the multiplexer selects between the third and fourth values to generate the multiplexed error detection information, and
the error corrector determines the second errors in the second data set while a corrected first data set is being transmitted to a host device, and while the third data set is being stored in the third buffer, and the fourth data set is being stored in the fourth buffer.

23. The error decoder of claim 16, wherein the first error detector calculates first branch metrics for the first data set, and the second error detector calculates second branch metrics for the second data set.

24. The error decoder of claim 23, further comprising a multiplexer that selects between the first and second branch metrics to provide a selected one of the first and second branch metrics to the error corrector.

25. The error decoder of claim 23, wherein the error corrector comprises:
an add-compare-select block;
a state metrics memory; and
a survivor path memory.

* * * * *